(No Model.)
C. A. GUHR & A. E. RICHTER.
HAY DRIER AND STACKER.
No. 503,368. Patented Aug. 15, 1893.
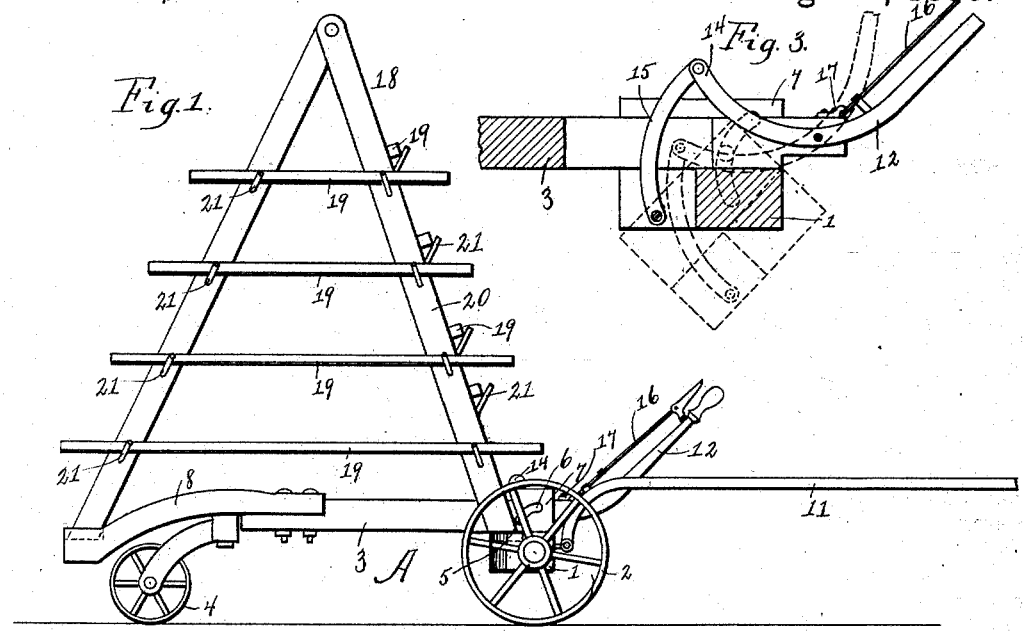
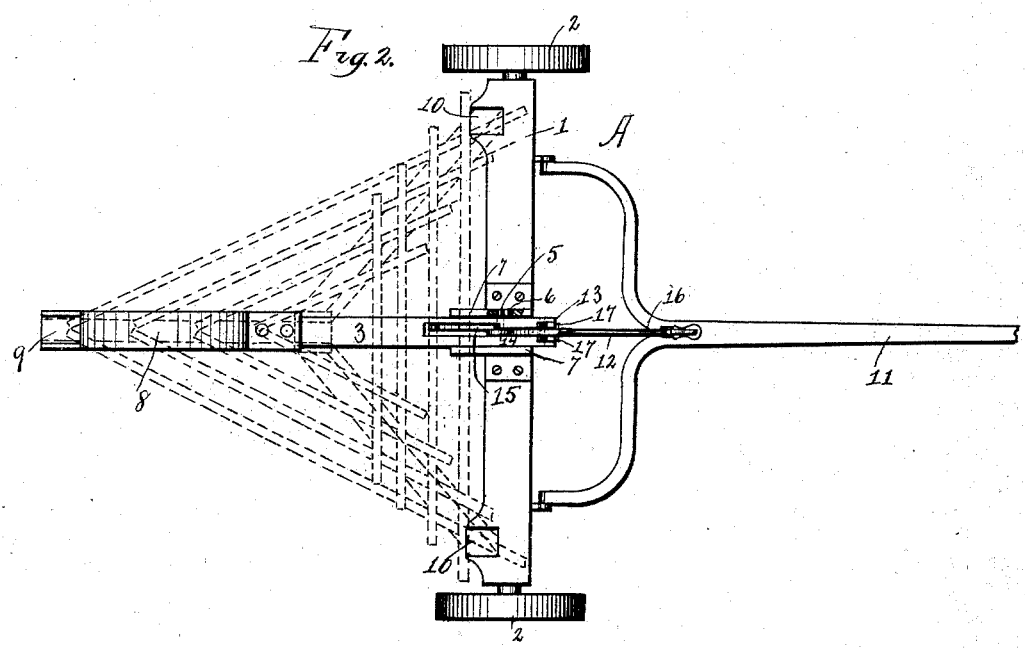

UNITED STATES PATENT OFFICE.

CHARLES AUGUST GUHR AND AUGUST ERNST RICHTER, OF CHICAGO, ILLINOIS.

HAY DRIER AND STACKER.

SPECIFICATION forming part of Letters Patent No. 503,368, dated August 15, 1893.

Application filed August 23, 1892. Serial No. 443,918. (No model.)

*To all whom it may concern:*

Be it known that we, CHARLES AUGUST GUHR and AUGUST ERNST RICHTER, citizens of the United States, residing at Chicago, in the county of Cook and State of Illinois, have invented certain new and useful Improvements in Hay Driers and Stackers; and we do hereby declare the following to be a full, clear, and exact description of the invention, such as will enable others skilled in the art to which it appertains to make and use the same.

This invention relates to a novel construction in a device for drying and stacking hay, and consists in the features of construction and combinations of parts hereinafter fully described and specifically claimed.

In the accompanying drawings illustrating our invention,—Figure 1 is a side elevation of the same. Fig. 2 is a top plan view of the truck or carriage. Fig. 3 is a detail sectional view.

Referring now to said drawings, A indicates as a whole the truck or carriage which consists of the axle 1 provided with supporting wheels 2, and the beam 3 extending rearwardly from said axle and provided with a swivel supporting wheel 4. The said beam 3 is provided at its forward end with two laterally projecting pins 5 that enter slots 6 in the uprising guide plates 7 mounted upon said axle 1, the forward end of said beam 3 being located between said guide plates 7. Secured to the rear end of said beam 3 and extending rearwardly is an arm 8 that is provided at its end with a socket 9. The said axle 1 is also provided near its ends with a socket 10, said sockets being located in the upper face or side of the axle and at the rear edge of the same, so that the rear edges of said sockets are open. A pole 11 is secured to the axle 1, by means of which the carriage or truck can be moved, although it will be understood, of course, that any suitable arrangement can be employed for moving the truck.

It will be noted that by reason of the slot and pin connection between the axle and the beam, said axle can be turned upon its axial center with relation to said beam, and we have provided devices for imparting to the axle such movement. To this end a lever 12 is pivoted between the bifurcated forward end portion 13 of said beam and has one end extending upwardly to be grasped by the operator, while its other end 14 extends rearwardly and is connected by a link 15 passing between the bifurcated end portion of said beam with the axle 1, said link being pivoted to said lever and to said axle. The said lever is also provided with a detent 16 that is located to engage a lug 17 carried by the beam when the axle is in a horizontal position, as shown in full lines in said drawings, but it will be noted, however, that by returning said detent from engagement with the lug the lever can be swung upon its pivot to throw down the rear edge of the axle, as shown in dotted lines in Fig. 3, the slot and pin connection between the axle and beam serving to permit such relative movement of the parts. The said truck forms a portable support for the frame upon which the hay is thrown as it is gathered from the field, and said frame comprises a tripod 18 and a series of bars 19 supported thereby. The said tripod embraces three legs 20 that are secured together at their upper ends in the usual manner, while the lower ends of said legs are adapted to rest within the sockets 9 and 10, so that said tripod can be carried by the truck. The sides of the legs 20 are provided with pins or supports 21 suitably disposed and adapted to receive and support the bars 19 in a familiar manner, as shown in Fig. 1.

When the device is in the position and condition shown in Fig. 1, it is ready for use and is drawn to a portion of the field where the hay is to be gathered, and the hay is thrown upon the frame 18 and supported by the bars 19 in an obvious manner. After the frame receives its allotted quantity of hay, the truck is then drawn to such location where the hay is to be stacked, and then by swinging the lever 16 to the position shown in dotted lines in Fig. 4 the axle will be inclined rearwardly so that the legs 20 will slip from the sockets 10 in said axle and drop to the ground, and then by drawing the truck forward the arm 8 will be drawn from under the rear leg of the tripod so that such leg will fall to the ground, whereupon the truck can be removed and used to convey another frame 18. It will be noted that the hay will be supported in such a manner by the frame as to permit a free circulation of air, so that any moisture in the hay will readily dry out.

We claim as our invention—

1. A device of the kind specified comprising a truck having an axle 1 provided with wheels 2, a beam 3 pivoted to said axle provided with a supporting wheel 4, and devices for moving said axle relatively to said beam upon the pivoted connection between said parts.

2. A truck comprising an axle 1 having guide plates 7 secured thereto and provided with slots 6, wheels 2 for supporting said axle, a beam 3 having its forward end located between said guide plates 7 and provided with pins 5 located within said slots 6, a supporting wheel for said beam, a lever 12 pivoted upon said beam and connected by means of a link 15 with said axle, and sockets in said axle and beam for supporting a suitable frame.

3. A truck comprising an axle 1 provided with guide plates 7 having slots 6 therein, supporting wheels for said axle, a beam 3 having a supporting wheel 4 and having its forward end located between said guide plates and provided with pins 5 located within said slots 6, a lever 12 pivoted within the forward bifurcated end of the beam 3 and connected by means of a link 15 passing through said bifurcated portion with the axle 1, and sockets 9 and 10 in said beam and axle.

4. A truck comprising an axle provided with supporting wheels 2, sockets 10 in the upper side of said axle and at the rear edge of the same, a beam pivoted at its forward end to said axle and provided with a supporting wheel, a rearwardly extending arm 8 upon said beam provided at its rear end with a socket 9, and devices for moving said axle with relation to said beam.

5. A device of the kind specified comprising a truck consisting of an axle and supporting wheels, a beam pivoted to said truck, a supporting wheel for said beam, sockets in said truck and beam, devices for turning said axle, and a frame 18 having legs resting within the sockets of the axle and beam.

In testimony whereof we affix our signatures in presence of two witnesses.

CHARLES AUGUST GUHR.
AUGUST ERNST RICHTER.

Witnesses:
RUDOLPH W. LOTZ,
E. J. BOILEAU.